United States Patent [19]

Kerpes et al.

[11] Patent Number: 5,362,844
[45] Date of Patent: Nov. 8, 1994

[54] CONTINUOUS PROCESS FOR THE PRODUCTION OF POLYESTER FOR FOOD PACKAGING

[75] Inventors: Hans Kerpes, Grossheubach; Ulrich Thiele, Bruchkoebel, both of Germany

[73] Assignee: Zimmer Aktiengesellschaft, Frankfurt, Germany

[21] Appl. No.: 214,958

[22] Filed: Mar. 16, 1994

[30] Foreign Application Priority Data

Mar. 23, 1993 [DE] Germany ............................ 4309227

[51] Int. Cl.$^5$ ..................... C08G 63/00; C08G 63/16
[52] U.S. Cl. .............................. 528/308.5; 528/308.2; 528/308.3; 528/308.8; 528/309.1; 264/5
[58] Field of Search ............... 528/308.2, 308.3, 308.5, 528/308.8, 309.1; 264/5

[56] References Cited

U.S. PATENT DOCUMENTS

| | | | |
|---|---|---|---|
| 4,205,157 | 5/1980 | Duh | 528/308.5 |
| 4,260,721 | 4/1981 | Ford et al. | 528/308.5 |
| 4,455,417 | 6/1984 | Vanderkooi, Jr. et al. | 528/308.5 |
| 5,270,444 | 12/1993 | Shiraki et al. | 528/308.5 |

*Primary Examiner*—Morton Foelak
*Attorney, Agent, or Firm*—Allegretti & Witcoff, Ltd.

[57] ABSTRACT

A continuous process for the production of low-modified polyethylene terephthalate for food packaging in which, while maintaining specific processing conditions, a precondensate is polycondensed in the melt, the polycondensate is pelletized, and the pellets are first hardened, then crystallized and subjected to dealdehydization. The process results in a polyester having a very low acetaldehyde content.

4 Claims, No Drawings

CONTINUOUS PROCESS FOR THE PRODUCTION OF POLYESTER FOR FOOD PACKAGING

DESCRIPTION

The invention relates to a continuous process for the production of polyester for food packaging, particularly lowmodified polyethylene terephthalates, by means of an optimized melt polycondensation and pelletizing, as well as a multi-stage heat treatment of the pellets.

BACKGROUND OF THE INVENTION

All linear polyesters known for food packaging are, at the present time, primarily produced in such a manner that a precondensate, obtained by direct esterification or by ester interchange, can only be brought to a medium level of viscosity by melt polycondensation. Higher viscosities are attained by means of a subsequent solid phase polycondensation, which generally is preceded by pelletizing and crystallization.

Polyesters for food packaging must have, apart from a high viscosity, the lowest possible concentration of free acetaldehyde and acetaldehyde which is bound as vinyl ester, since the acetaldehyde gives packaged foods an unpleasant taste and smell. In the case of mineral waters, less than 3 ppm acetaldehyde, corresponding to less than 1 ppm of free acetaldehyde and less than 10 ppm of bound acetaldehyde in the pellets used for the production of the bottle, should be detectable within the wall of the bottle. Still lower values would be preferable. Non-colored packaging should be highly transparent and subjectively colorless,

THE PRIOR ART

Various proposals for the reduction of the acetaldehyde content of polyester are known from the literature. In the process in accordance with GB-A 2 051 100 (equivalent to U.S. Pat. No. 4,238,593), acetaldehyde values in the pellets of slightly less than 3 ppm are only achieved if the carboxyl-end group content of the polyester pellets which are to be used in the solid phase polycondensation is enhanced by adding supplementary dicarboxylic acid after the esterification stage. Somewhat more favorable acetaldehyde values of 0.9 to 1.2 ppm in the pellets are attained in accordance with the process of U.S. Pat. No. 4,340,721, in which the melt polycondensation is cut off at a viscosity corresponding to 75 to 90% of the maximum possible viscosity.

DD-A 94 895 discloses solid phase polycondensation of a polyester which, to assure a high polycondensation rate, should have a carboxyl-end group content of not more than 1.4 val/mol (52 meq/kg), for example, of approximately 0.8 val/mol (30 meq/kg), and which was previously subjected to a vacuum drying, first for 3 hours at 50° C. and then for several hours at increasing temperatures up to and at 175° C. Hydrolytic decomposition by reason of surface moisture and as a result an increase of the carboxyl-end group content are prevented by preliminary drying at low temperature. Acetaldehyde and the related problems are not mentioned.

Other disclosures relate to the implementation of solid phase polycondensation, without specification of the manufacturing process which precedes the same. The achievement of acetaldehyde values in the pellets of less than 0.5 ppm as stated in EP-B 0 222 714, for example, depends on the quality of the polyester used in the solid phase polycondensation, and is not ensured in every case.

THE INVENTION

Thus, there still exists a need for a process for the production of polyester of a quality which is suitable for further processing into food packagings. The object of the present invention is to provide a process for the production of polyethylene terephthalate, modified with 0.5 to 10 weight % of one or more comonomers, having an intrinsic viscosity of at least 0.60 dl/g and, as measured in the pellets, a free acetaldehyde content of less than 0.5 ppm, and a bound acetaldehyde content of less than 5 ppm, in which these quality values are reproducible in every case. The process should, at the same time, require low costs for the materials, the energy, and equipment. This object is achieved in accordance with the invention by means of a process which corresponds to the following essential conditions:

1) The design and operating parameters of the final melt polycondensation reactor are selected so that the polycondensate has, at the reactor outlet, an intrinsic viscosity of 0.60 to 0.95 dl/g, preferably 0.65 to 0.75 dl/g, a carboxyl-end group concentration of 25 to 45 meq/kg, and a free acetaldehyde content of less than 30 ppm, preferably less than 25 ppm.

2) The residence time and the temperature of the polycondensation melt between the discharge outlet from the last melt polycondensation reactor and the discharge outlet from the pelletizer are selected in such a manner, that the free acetaldehyde content of the polycondensate at the discharge outlet from the pelletizer is less than 30 ppm, and preferably less than 25 ppm, higher than it is at the discharge outlet of the reactor.

3) The polyester pellets, having a specific surface area of 1.8 to 2.9 $m^2$/kg, preferably 2.0 to 2.6 $m^2$/kg and a first-softening temperature (Te-1), of 60° to 75° C., preferably 68° to 72° C., as measured in a TMA analyzer as described below, are hardened at a temperature in the range between 30° C. and Te-1 in air, $CO_2$, $N_2$ or in mixtures of the same, for a time sufficient to raise the firstsoftening temperature (Te-2) by 2° to 12° C., preferably by 4° to 8° C. relative to Te-1.

4) The hardened polyester pellets are crystallized at a temperature in the range between Te-2 and 230° C. in dry air, $CO_2$, $N_2$ or mixtures thereof, for a time sufficient for the first-softening temperature (Te-3) to increase by 100° to 150° C., preferably 110° to 125° C., relative to Te-2, said value of Te-3 lying in the same range as the temperature at which the subsequent dealdehydization is carried out.

5) During dealdehydization at a temperature in the range of 175° to 225° C. in dry air, $CO_2$, $N_2$ or mixtures thereof, the mass ratio of gas to polyester lies in a range from 0.05–10.0 to 1.0.

DETAILED DESCRIPTION

The starting product of the process in accordance with the invention is a polyethylene terephthalate precondensate, modified with 0.5 to 10 weight % of a comonomer, the precondensate having an intrinsic viscosity in the range of 0.18 to 0.50 dl/g, preferably 0.20 to 0.30 dl/g. Diethylene glycol, triethylene glycol, 1,4-cyclohexane dimethanol, isophthalic acid, 2,6-naphthalene dicarboxylic acid, adipic acid and mixtures thereof are particularly suited as comonomers. The production of the precondensate is carried out, in the known manner, by means of the direct esterification of terephthalic acid, or by means of the ester interchange of dimethyl terephthalate with ethylene glycol in the presence of one or more comonomers. Diethylene glycol is generated during the polyester synthesis, and should be added only if a concentration of more than approx. 0.8 weight % is desired. The mol ratio of diols to carboxylic acids and the reaction conditions are to be set in such a manner that the precondensate has no more than 250 meq/kg, preferably no more than 100 meq/kg, of carboxyl-end groups.

The precondensate containing the usual catalyst system is conveyed to the melt-polycondensation reactor. A combination of compounds of antimony, germanium or titanium, with a cobalt compound and a phosphorous compound, is preferred as a catalyst system. The following are particularly preferred:

100–300 ppm, particularly 150–250 ppm, of Sb; and:
5–50 ppm, particularly 10–20 ppm, of Co; and:
5–100 ppm, particularly 10–30 ppm, of P.

The melt polycondensation must be carried out at the highest possible reaction speed, and at the lowest possible temperature. The melt-polycondensation is preferably carried out in a reactor having multiple annular disks at a temperature which increases, from the reactor inlet to the reactor outlet, in the range of 268° to 288° C., preferably from 270° to 282° C., and under a high vacuum. A suitable device and process is the object of the U.S. Pat. Nos. 3,617,225 and 3,499,873, incorporated herein by reference.

The operating parameters of the melt polycondensation reactor are adjusted in such a manner that the polycondensate at the reactor outlet has an intrinsic viscosity in the range of 0.60 to 0.95 dl/g, preferably 0.65 to 0.75 dl/g, a carboxyl-end group concentration of 25 to 45 meq/kg, and a content of free acetaldehyde of less than 30 ppm, preferably less than 25 ppm. The lower the polycondensation temperature and the higher the polycondensation speed, the lower is the acetaldehyde content. There consequently exists a direct dependence on the reactor design.

The intrinsic viscosity of the final polyester for food packaging is composed of the intrinsic viscosity which is achieved in the melt phase and the increase of the intrinsic viscosity which occurs during the solid phase treatment which immediately follows. The solid phase treatment is directed to attaining the low acetaldehyde values which are desired. The increase in the intrinsic viscosity should correspond only to that which accompanies this dealdehydization. The intrinsic viscosity which is attained in the melt phase should thus lie slightly lower than the desired end viscosity, for example, by 0.05 to 0.15 dl/g, preferably by 0.07 to 0.12 dl/g, lower than this end viscosity.

The polycondensate is subsequently conveyed from the polycondensation reactor to a pelletizer. Although the location of the pelletizer is normally determined by the spatial arrangement of the plant, which usually requires very long lines, the pelletizer is, in accordance with the invention, directly connected to the outlet of the polycondensation reactor. The residence time and temperature of the polycondensate melts between the outlet of the reactor and the outlet of the pelletizer are to be selected in such a manner that the content of free acetaldehyde at the outlet of the pelletizer is less than 30 ppm higher, and preferably less than 25 ppm higher, than that at the outlet of the reactor. The residence time must correspondingly be below 5 min., preferably below 3 min. The temperature of the melt is equal to or less than the temperature at the reactor outlet. These conditions are essential to the invention, since only the use of polycondensate pellets with uniformly low acetaldehyde content for the solid phase dealdehydization will provide the desired polyester suitable for food packaging in a reproducible manner.

One further condition is a specific surface area of the pellets in the range of from 1.8 to 2.9 $m^2$/kg, preferably 2.0 to 2.6 $m^2$/kg, which, with a regular shape of the pellet corresponds to a pellet weight of approx. 5 to 20 mg, preferably 8 to 15 mg.

The mainly amorphous polyester pellets leaving the pelletizer have a first-softening temperature (Te-1), as measured by means of TMA (Thermal-Mechanical Analysis), at a heating rate of 2° C./min. and a load of 0 5 N, in the range of 60° to 75° C. preferably 68° to 72° C.

In accordance with the invention, the pellets are subjected, before crystallization and dealdehydization, to a hardening at a temperature below the glass transition temperature. For this, the pellets are exposed in the presence of air, $CO_2$, $N_2$ or mixtures thereof, the dew point of which lies below the treatment temperature — at a mass ratio of gas to polymer, in the range of 0.05–5.0 to 1.0 — to a temperature in the range between 30° C. and Te-1, preferably between 55° C. and Te-1, and for a time sufficient for the first-softening temperature of the polyester (Te-2) to increase by 2° to 12° C., preferably by 4° to 8° C., relative to Te-1. For this, 5 to 150 hours, preferably 10 to 60 hours, and most preferably 20 to 40 hours, are necessary. The higher the treatment temperature, the shorter the treatment time.

Simultaneously to this hardening a partial dealdehydization, relative to free acetaldehyde, of up to 50% occurs. Furthermore, it creates favorable conditions for the later crystallization and dealdehydization. Furthermore, the pellet hardening, which is conducted at a low temperature level, permits the use of waste process heat, such as heat from the melt polycondensation, the crystallization and/or the dealdehydization. The energy requirement during the crystallization which next follows decreases in proportion to the extent of the preheating.

The hardened pellets are subsequently subjected, in the conventional manner, to crystallization in dry (with a dew point of below −20° C.) air, $CO_2$, $N_2$ or mixtures thereof, at a mass ratio of gas to polyester in the range from 0.05–12.0 to 1.0, or for crystallization in a solid bed from 0.05–2.0 to 1o0, and at a temperature in the range of Te-2 to 230° C., preferably from Te-2 plus 85° C. up to 205° C. The crystallization is continued until the first-softening temperature (Te-3) of the polyester has increased by 100° to 150° C., preferably by 110° to 125° C. relative to Te-2, and lies in the same range as the temperature at which the dealdehydization is carried out. It is to be understood here by "same range" that when the dealdehydization is carried out at a relatively low temperature of up to approx. 190° C., as this is the case, in the presence of oxygen-containing treatment gases, Te-3 may be a few degrees lower than the dealdehydization temperature whereas, at a higher dealdehydization temperature, Te-3 may be a few degrees higher than the dealdehydization temperature. Depending on the kind of the polyester, in particular the type and the concentration of the comonomer, 0.5 to 5.0 hours, preferably 1.0 to 2.0 hours, are necessary for crystallization. In the normal case, a partial dealdehydization occurs simultaneously to the crystallization.

The crystallized pellets are then subjected, in the known manner, to dealdehydization in dry (dew point below −20° C.) air, $CO_2$, $N_2$ or mixtures thereof, at a temperature in the range from 175° to 225° C. preferably 175° to 190° C. in the presence of $O_2$, or 180° to 200° C. in the absence of $O_2$, for a time sufficient to attain the desired, predetermined acetaldehyde and intrinsic viscosity values. A slight solid phase polycondensation of the polyester is carried out simultaneously with the dealdehydization. The polyester produced in accordance with the invention had, surprisingly, a higher subjective colorlessness (bluish-white, not yellowish) if smaller quantities of treatment gas were used, relative to polyester. A mass ratio of gas to polyester in the range of 0.05–10.0 to 1.0, or for dealdehydization in the solid bed of 0.05–2.0 to 1.0, proved to be favorable.

Treatment gases of differing or the same composition can be used for hardening, and crystallization, as well as for dealdehydization.

The low-modified polyethylene terephthalate which is produced in accordance with the invention has an intrinsic viscosity of at least 0.60 dl/g, a content of free acetaldehyde of less than 0.5 ppm, and of bound acetaldehyde of less than 5 ppm, and is thus remarkably suited for the production of food packaging. The low content of the bound acetaldehyde is of particular importance since bound aldehyde is essentially responsible for the increase of the free acetaldehyde during the processing into packaging materials.

SPECIFIC EXAMPLES

The characteristic data of the polyester described herein were determined in the following manner:

Intrinsic viscosity 125 mg of polyester are dissolved in 25 ml of a mixture of phenol and 1,2-dichlorobenzol (3 to 2 weight portions), and the relative viscosity of this solution is determined, at 25° C. in accordance with the Ubbelohde method. The intrinsic viscosity was computed, in accordance with the Billmeyer method, from the relative viscosity.

Content of free acetaldehyde physically dissolved in the polyester

The ethylene terephthalate polymer which is to be analyzed is ground after cooling with liquid nitrogen, and the sieving fraction which is smaller than 0.4 mm is used for the analysis. 2.0 grams of the polyester sample are placed into a 30 ml bottle with a septum, and previously rinsed with nitrogen. The bottle is sealed and maintained, over the course of 90 min., at 150° C. A 2 ml sample of the nitrogen-acetaldehyde gas mixture is taken through the septum, from the gas space of the bottle, and the acetaldehyde content is determined by gas chromatographic means.

Content of acetaldehyde chemically bound in the polyester 2.0 grams of the polyester sample, ground and sieved as previously described, are placed into a 30 ml bottle with a septum, and previously rinsed with nitrogen, and 1.0 g of distilled water is then added. After the sealing of the bottle, it is kept at 150° C. for 15 hours, then cooled off to 90° C. and kept at this temperature for 90 minutes. The determination of the acetaldehyde is carried out, as previously, by gas chromatographic means, on a 2 ml sample.

First-Softening Temperature (Te)

One pellet of the polyester sample is brought into the measuring cell of the METTLER Analyzer, Type TMA 40, and the measuring sensor is set on the pellet sample and loaded with 0.5 N. After that, the temperature program is initiated with a heat-up rate of 2.0° C. per minute, and the deformation of the sample is recorded as a function of the temperature. The deformation curve, on the assumption of a sensitivity of 500 μm, is evaluated in such a manner that the temperature of the first visible deformation is designated as the temperature of the first softening (Te). The average value of 3 measurements is stated.

EXAMPLES 1 TO 3

A polyethylene terephthalate precondensate, modified with 2.5 weight % of isophthalic acid and 1.2 weight % of diethylene glycol, was polycondensed, in the presence of 180 ppm of Sb and 10 ppm of P (in the form of their compounds), in an annular disks reactor in the melt. The polycondensate was pelletized and the amorphous pellets hardened in air with a dew point of ±15° C. The hardened pellets were crystallized in the solid bed in air with a dew point of −25° C. and subsequently, the crystallized pellets were subjected to dealdehydization in the solid bed in air with a dew point of −60° C. The process parameters which were used, as well as the polymer characteristics, are summarized in Table 1:

TABLE 1

| | Example number: | | |
|---|---|---|---|
| | 1 | 2 | 3 |
| Precondensate: | | | |
| Intrinsic viscosity, dl/g: | 0.23 | 0.25 | 0.21 |
| Free COOH groups, meq/kg: | 100 | 100 | 45 |
| Melt polycondensation: | | | |
| Inlet temperature, °C.: | 274 | 274 | 276 |
| Outlet temperature, °C.: | 281 | 282 | 281 |
| Polycondensate at the reactor outlet: | | | |
| Intrinsic viscosity, dl/g: | 0.68 | 0.64 | 0.60 |
| Free COOH groups, meq/kg: | 25 | 28 | 27 |
| Free acetaldehyde, ppm: | 14 | 12 | 14 |
| Amorphous pellets: | | | |
| Spec. surface, m²/kg: | 2.35 | 2.25 | 2.25 |
| Pellet weight, mg/pellet: | 9 | 10 | 10 |
| Free acetaldehyde, ppm: | 35 | 40 | 35 |
| Te-1, °C.: | 71 | 71 | 71 |
| Hardening: | | | |
| Temperature, °C.: | 60 | 65 | 60 |
| Residence time, hours: | 20 | 18 | 20 |
| Hardened pellets: | | | |
| Free acetaldehyde, ppm: | 10 | 12 | 9 |
| Te-2, °C.: | 77 | 76 | 77 |
| Crystallization: | | | |
| Temperature, °C.: | 185 | 180 | 189 |
| Residence time, in hours: | 2 | 2 | 2 |
| Weight ratio - gas to polyester: | 0.1:1 | 0.1:1 | 0.2:1 |
| Crystallized pellets: | | | |
| Te-3, °C.: | 188 | 185 | 190 |
| Dealdehydization: | | | |
| Temperature, °C.: | 188 | 185 | 188 |
| Residence time, in hours: | 12 | 14 | 12 |
| Weight ratio - gas to polyester: | 1:1 | 1.25:1 | 1:1 |
| Pellets after dealdehydization: | | | |
| Intrinsic viscosity, dl/g: | 0.78 | 0.74 | 0.72 |
| Free acetaldehyde, ppm: | <0.5 | <0.5 | <0.5 |

TABLE 1-continued

| | Example number: | | |
|---|---|---|---|
| | 1 | 2 | 3 |
| Bound acetaldehyde, ppm: | 4 | 4.5 | 3.5 |

EXAMPLES 4 TO 6

Comparative Examples

A polyethylene terephthalate, modified with 2.5 weight % isophthalic acid and 1.2 weight % of diethylene glycol, was polycondensed in the melt in the presence of 180 ppm Sb and 10 ppm P (in the form of their compounds) in an annular disks reactor, and further treated as described in Examples 1 to 3, but with those deviations from the process of the invention set forth below and in Table 2.

In Example 4, the hardening of the amorphous pellets is carried out at a temperature which is too low (22° C.). At this low temperature, neither a rise of the first-softening temperature, nor a partial dealdehydization, could be attained. The pellets which come into use in the following crystallization have the same characteristics as the non-hardened, amorphous pellets. The consequence, in comparison with Example 2, which is otherwise similar, is an increased acetaldehyde value of the pellets after dealdehydization.

In Example 5, the hardening was likewise carried out at the same low temperature of 22° C. In addition, the melt polycondensation was carried out at a temperature which is too high, particularly at the reactor outlet (290° C.). This resulted in a high content of free acetaldehyde at the reactor outlet (40 ppm). A further deterioration of the acetaldehyde values of the pellets after dealdehydization is the consequence.

In Example 6, the amorphous pellets have a specific surface which is too low (1.45 m²/kg). As a comparison with the otherwise similar Example 1 shows, only an incomplete dealdehydization can be attained. The acetaldehyde values of the hardened pellets are approximately twice as high, and those of the pellets after dealdehydization are approximately 4 to 5 times higher than those of Example 1. The increase of the intrinsic viscosity during the solid phase treatment is, moreover, lower.

TABLE 2

| Comparative examples. | | | |
|---|---|---|---|
| | Comparative example number: | | |
| | 4 | 5 | 6 |
| Precondensate: | | | |
| Intrinsic viscosity, dl/g: | 0.23 | 0.20 | 0.22 |
| Free COOH groups, meq/kg: | 80 | 40 | 60 |
| Melt polycondensation: | | | |
| Inlet temperature, °C.: | 274 | 284 | 274 |
| Outlet temperature, °C.: | 282 | 290 | 281 |
| Polycondensate at the reactor outlet: | | | |
| Intrinsic viscosity, dl/g: | 0.64 | 0.64 | 0.66 |
| Free COOH groups, meq/kg: | 22 | 31 | 24 |
| Free acetaldehyde, ppm: | 13 | 40 | 14 |
| Amorphous pellets: | | | |
| Spec. surface, m²/kg: | 2.25 | 1.95 | 1.45 |
| Pellets weight, mg/pellet: | 10 | 18 | 26 |
| Free acetaldehyde, ppm: | 38 | 64 | 36 |
| Te-1, °C.: | 71 | 71 | 71 |
| Hardening: | | | |
| Temperature, °C.: | 22 | 22 | 60 |
| Residence time, hours: | 24 | 24 | 20 |
| Hardened pellets: | | | |

TABLE 2-continued

| Comparative examples. | | | |
|---|---|---|---|
| | Comparative example number: | | |
| | 4 | 5 | 6 |
| Free acetaldehyde, ppm: | 38 | 62 | 20 |
| Te-2, °C.: | 71 | 71 | 75 |
| Crystallization: | | | |
| Temperature, °C.: | 185 | 180 | 185 |
| Residence time, in hours: | 2 | 2 | 2 |
| Weight ratio - gas to polyester: | 0.1:1 | 0.1:1 | 0.1:1 |
| Crystallized pellets: | | | |
| Te-3, °C.: | 185 | 182 | 187 |
| Dealdehydization: | | | |
| Temperature, °C.: | 185 | 185 | 185 |
| Residence time, in hours: | 12 | 14 | 14 |
| Weight ratio - gas to polyester: | 1:1 | 0.5:1 | 1:1 |
| Pellets after dealdehydization: | | | |
| Intrinsic viscosity, dl/g: | 0.72 | 0.66 | 0.68 |
| Free acetaldehyde, ppm: | 0.9 | 1.5 | 2.5 |
| Bound acetaldehyde, ppm: | 6 | 12 | 12 |

Similar results as in the preceding examples of polyethylene terephthalate, modified with diethylene glycol and isophthalic acid, are attained with other low-modified polyethylene terephthalates, whereby the greatest economic significance is with those modified with diethylene glycol, or those modified with diethylene glycol, 1,4-cyclohexane dimethanol, and isophthalic acid.

The solid phase treatment in the presence of $N_2$, $CO_2$, or the mixtures thereof is also equivalent to that in air. With oxygen-free treatment gases, higher temperatures can be applied within the ranges stated for crystallization and dealdehydization, with the simultaneous reduction of the length of treatment.

We claim:

1. A continuous process for making a modified ethylene terephthalate polymer having an intrinsic viscosity of at least 0.60 dl/g, measured by dissolving 125 mg of polyester in 25 ml of a mixture of phenol and 1,2-dichlorobenzol (ratio 3:2 by weight) at 25° C., a free acetaldehyde content measured on pellets of less than 0.5 ppm and a bound acetaldehyde content of less than 5.0 ppm comprising (a) introducing a polyethylene terephthalate precondensate modified with 0.5 to 10 weight percent of one or more comonomers, said precondensate having an intrinsic viscosity of 0.18 to 0.50 dl/g, into a polycondensation reactor, (b) melt polycondensing said precondensate at an increasing temperature in the range of 268° to 288° C. in the presence of a polycondensation catalyst to produce a polycondensate at the reactor outlet having an intrinsic viscosity of 0.60 to 0.95 dl/g, 25 to 45 meq/kg of carboxyl-end groups and a free acetaldehyde content of less than 30 ppm, (c) passing said polycondensate from said reactor into a pelletizer, whereby between the outlet of the reactor and the outlet of the pelletizer the temperature is maintained at a temperature not higher than the temperature at the reactor outlet and for a residence time corresponding to an increase of free acetaldehyde of less than 30 ppm, to produce amorphous pellets with a specific surface area of 1.8 to 2.9 m²/kg, (d) hardening said amorphous pellets which have a first-softening temperature in the range of 60° to 75° C. (Te-1), measured in a TMAanalyzer at a heat-up rate of 2° C./min., at a temperature between 30° C. and Te-1 in the presence of a gas taken from air, $CO_2$, $N_2$ or mixtures thereof, the dew point of which is below the hardening temperature, and for a time sufficient for the first-softening temperature (Te-2) to increase by 2° to 12° C. relative to Te-1, (e) crystallizing said hardened pellets at a temperature in the range of between Te-2 and 230° C. in the presence of a gas taken from air, $CO_2$, $N_2$ or mixtures thereof, the dew point of which is below −20° C., the mass ratio of gas to pellets being in the range of 0.05–12.0 to 1.0 and for a time sufficient for the first-softening temperature (Te3) to increase by 100° to 150° C. relative to Te-2 and to a value which lies within the temperature range at which the solid phase polycondensation subsequently is carried out in step (f), and (f) subjecting said crystallized pellets to dealdehydization at a temperature in the range of 175° to 225° C. in a gas taken from air, $CO_2$, $N_2$ or mixtures thereof, the dew point of which is below −20° C., the mass ratio of gas to pellets being in the range of 0.05–10.0 to 1.0 for a time sufficient to attain predetermined acetaldehyde and intrinsic viscosity values.

2. Process in accordance with claim 1 in which said comonomer is diethylene glycol, 1,4-cyclohexane dimethanol, isophthalic acid, or mixtures thereof.

3. Process in accordance with claim 1 or 2 in which the increase of the content of free acetaldehyde in step (c) amounts to less than 25 ppm, Te-1 is equal to 68° to 72° C., Te-2 is equal to Te-1 plus 4° to 8° C., and Te-3 is equal to Te-2 plus 110° to 125° C.

4. Process in accordance with claim 1 or 3 in which the treatment temperature during step (d) is in the range of 55° C. to Te-1, during step (e) in the range from (Te-2+85° C.) to 205° C., and during step (f) in the range of 175° to 190° C., in the presence of $O_2$, or from 180° to 200° C., in the absence of $O_2$.

* * * * *